US012431679B2

(12) United States Patent
Lan et al.

(10) Patent No.: US 12,431,679 B2
(45) Date of Patent: Sep. 30, 2025

(54) CONNECTOR FOR HIGH-CURRENT POWER TRANSMISSION

(71) Applicant: Luxshare Precision Industry Company Limited, Shenzhen (CN)

(72) Inventors: Rongqin Lan, Shenzhen (CN); Hong Chi, Shenzhen (CN); Min Fan, Shenzhen (CN); Zhiyong Li, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 476 days.

(21) Appl. No.: 18/072,844

(22) Filed: Dec. 1, 2022

(65) Prior Publication Data

US 2023/0352893 A1 Nov. 2, 2023

(30) Foreign Application Priority Data

Apr. 27, 2022 (CN) ........................ 202210455627.0

(51) Int. Cl.
*H01R 31/06* (2006.01)
*H01R 35/02* (2006.01)

(52) U.S. Cl.
CPC ............ *H01R 31/06* (2013.01); *H01R 35/02* (2013.01)

(58) Field of Classification Search
CPC ................................ H01R 31/06; H01R 35/02
See application file for complete search history.

(56) References Cited

U.S. PATENT DOCUMENTS 2,080,609 A * 5/1937 Heim ...................... F16C 33/64 384/564
9,004,938 B2 * 4/2015 Chang .................. H01R 12/716 439/541.5

(Continued)

FOREIGN PATENT DOCUMENTS

CN 201888713 U 6/2011
CN 202712549 U 1/2013
TW 200939574 A 9/2009

OTHER PUBLICATIONS

Chinese Notice of Grant and Search Report for Chinese Application No. 202210455627.0, dated Oct. 31, 2024, with English translation.

*Primary Examiner* — Thanh Tam T Le
(74) *Attorney, Agent, or Firm* — Birch, Stewart, Kolasch & Birch, LLP

(57) ABSTRACT

A connector includes a housing, an adapter plate, a flexible transmitter, a conductive tab and a conductive connection tab. The housing is provided with an accommodation cavity. One end of the adapter plate is mounted on an inner wall of the housing, and the other end of the adapter plate extends out of one end of the accommodation cavity. The flexible transmitter is accommodated in the accommodation cavity. One end of the flexible transmitter is connected to the adapter plate. The conductive tab is accommodated in the accommodation cavity. One end of the conductive tab is connected to the other end of the flexible transmitter. The conductive connection tab is accommodated in the accommodation cavity. One end of the conductive connection tab is connected to the adapter plate, the other end of the conductive connection tab is connected to the conductive tab, and the conductive connection tab is deformable.

10 Claims, 8 Drawing Sheets

(56) References Cited

U.S. PATENT DOCUMENTS

| | | | | |
|---|---|---|---|---|
| 9,685,748 | B2 * | 6/2017 | Wang | H01R 24/28 |
| 10,381,776 | B2 * | 8/2019 | Wu | H01R 13/665 |
| 11,095,067 | B2 * | 8/2021 | Chang | H01R 31/065 |
| 11,444,420 | B2 * | 9/2022 | Lee | H01R 31/06 |
| 11,749,919 | B2 * | 9/2023 | Jin | H01R 31/06<br>439/65 |
| 11,749,926 | B2 * | 9/2023 | Jung | B60R 16/02<br>439/889 |
| 11,784,438 | B2 * | 10/2023 | Yokota | H05K 1/025<br>439/78 |
| 11,799,254 | B2 * | 10/2023 | Zhang | H01R 13/5219 |
| 12,088,028 | B2 * | 9/2024 | Lin | H01R 24/54 |
| 2010/0151743 | A1 * | 6/2010 | Zhou | H01R 9/03<br>439/651 |
| 2010/0291794 | A1 | 11/2010 | Luo et al. | |
| 2014/0065848 | A1 | 3/2014 | Chang | |
| 2017/0133806 | A1 | 5/2017 | Wang et al. | |

* cited by examiner

CONNECTOR FOR HIGH-CURRENT POWER TRANSMISSION

CROSS-REFERENCE TO RELATED APPLICATION(S)

This application claims priority to Chinese Patent Application No. 202210455627.0 filed Apr. 27, 2022, the disclosure of which is incorporated herein by reference in its entirety.

TECHNICAL FIELD

The present disclosure relates to the technical field of connectors and, in particular, to a connector.

BACKGROUND

With the rapid development of electronic industries, the structure of a connector is also constantly updated. The connector with a flexible transmitter is used in multiple electronic components. However, in a related connector, on the one hand, the flexible transmitter built in the connector and configured to transmit an electrical signal has restrictions on the high-current power transmission, and on the other hand, to ensure the stability of the electrical signal transmission, the flexible transmitter inside the connector, and a tab or a conductive terminal for plugging with an electrical connection interface on an external product are both fixed to an insulation body of the connector. As a result, the connector cannot be connected in alignment to the electrical connection interface on the external product flexibly. Therefore, it is necessary to improve the related connector so that the connector has effects of high-current power transmission, flexible alignment connection and stable transmission of the electrical signal.

SUMMARY

A connector is provided so that the connector can be connected in alignment to an electrical connection interface on an external product flexibly, enhancing the overcurrent capability of the connector, and achieving the stable transmission of the high-current power.

The solution described below is provided.

A connector includes: a housing, an adapter plate, a flexible transmitter, a conductive tab and a conductive connection tab.

The housing is provided with an accommodation cavity extending through in a length direction of the housing.

The adapter plate is configured to transmit an electrical signal. One end of the adapter plate is mounted on an inner wall of the housing and the other end of the adapter plate extends out of one end of the accommodation cavity.

The flexible transmitter is accommodated in the accommodation cavity. One end of the flexible transmitter is connected to the adapter plate.

The conductive tab is accommodated in the accommodation cavity. One end of the conductive tab is connected to the other end of the flexible transmitter, and the other end of the conductive tab faces the other end of the accommodation cavity.

The conductive connection tab is accommodated in the accommodation cavity. One end of the conductive connection tab is connected to the adapter plate, and the other end of the conductive connection tab is connected to the conductive tab. The conductive connection tab is deformable.

BRIEF DESCRIPTION OF DRAWINGS

The drawings used in description of the embodiment will be briefly described below. Apparently, the drawings described below merely illustrate part of the embodiment of the present disclosure, and those of ordinary skill in the art can also obtain other drawings on the basis of the contents in the embodiment of the present disclosure and theses drawings on the premise that no creative work is done.

REFERENCE LIST

Figure 1:
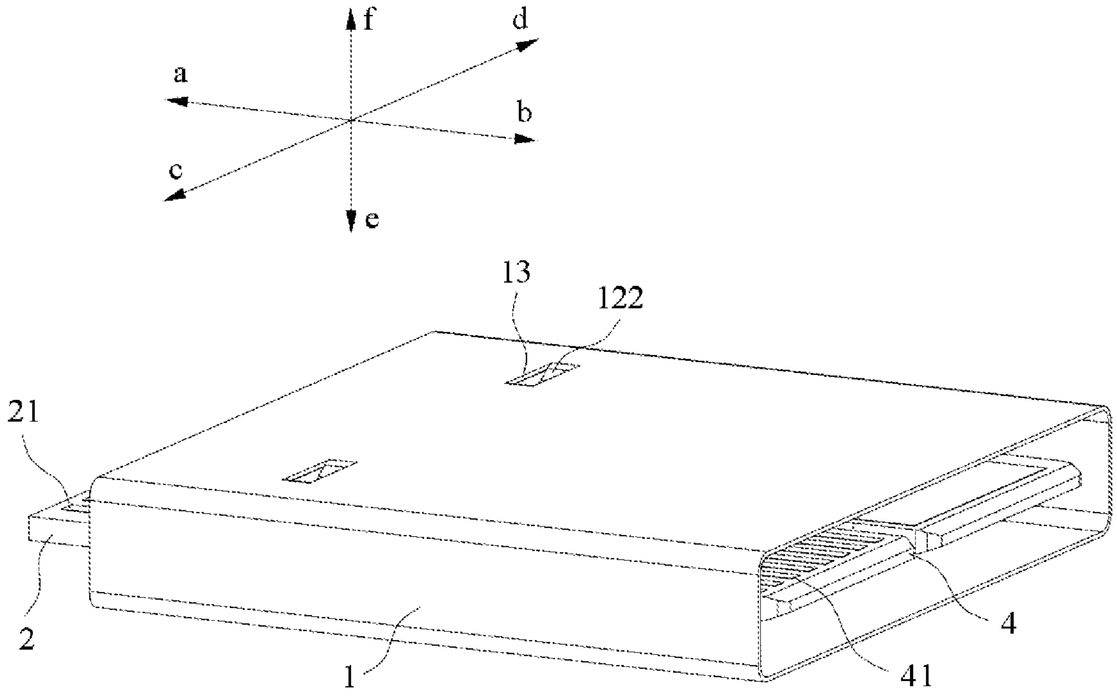
FIG. 1 is a view illustrating the structure of a connector according to an embodiment of the present disclosure.

1 housing
11 accommodation cavity
111 first gap
112 second gap
113 third gap
12 stop baffle plate
121 first baffle tab
122 second baffle tab
13 via
2 adapter plate
21 gold finger
22 first weld portion
3 flexible transmitter
4 conductive tab
41 signal terminal
42 second weld portion
5 conductive connection tab
51 bending section
52 connection section
61 fixing block
611 mounting groove
612 positioning groove
62 stop block
63 support block
631 fixing head
632 detent rib
6321 extension section
633 stiffening rib

DETAILED DESCRIPTION

The solution of the present disclosure will be described below in conjunction with the drawings and the embodiment from which the solution will be apparent to those skilled in the art.

In the description of the present disclosure, it is to be noted that the orientational or positional relationships indicated by terms "above", "below", "left", "right", "vertical", "horizontal", "inside", "outside" and the like are based on the orientational or positional relationships illustrated in the drawings or the orientational or positional relationship in which products of the present disclosure are usually placed during use. These orientational or positional relationships are for the mere purpose of facilitating and simplifying the description of the present disclosure and do not indicate or imply that the apparatus or element referred to has a specific orientation and is constructed and operated in a specific orientation. In addition, terms such as "first" and "second" are used merely for the purpose of description, or are used for distinguish different structures or components, and are not to be construed as indicating or implying relative importance.

In the description of the present disclosure, it is to be noted that terms "mounted", "joined", and "connected" are to be understood in a broad sense unless otherwise expressly specified. For example, the term "connected" may refer to "securely connected" or "detachably connected", may refer to "mechanically connected" or "electrically connected" or may refer to "connected directly", "connected indirectly through an intermediary" or "connected inside two components". For those of ordinary skill in the art, specific meanings of the preceding terms in the present disclosure may be construed based on specific situations.

Technical solutions of the present disclosure are further described hereinafter in conjunction with the drawings and the embodiments.

Figure 2:
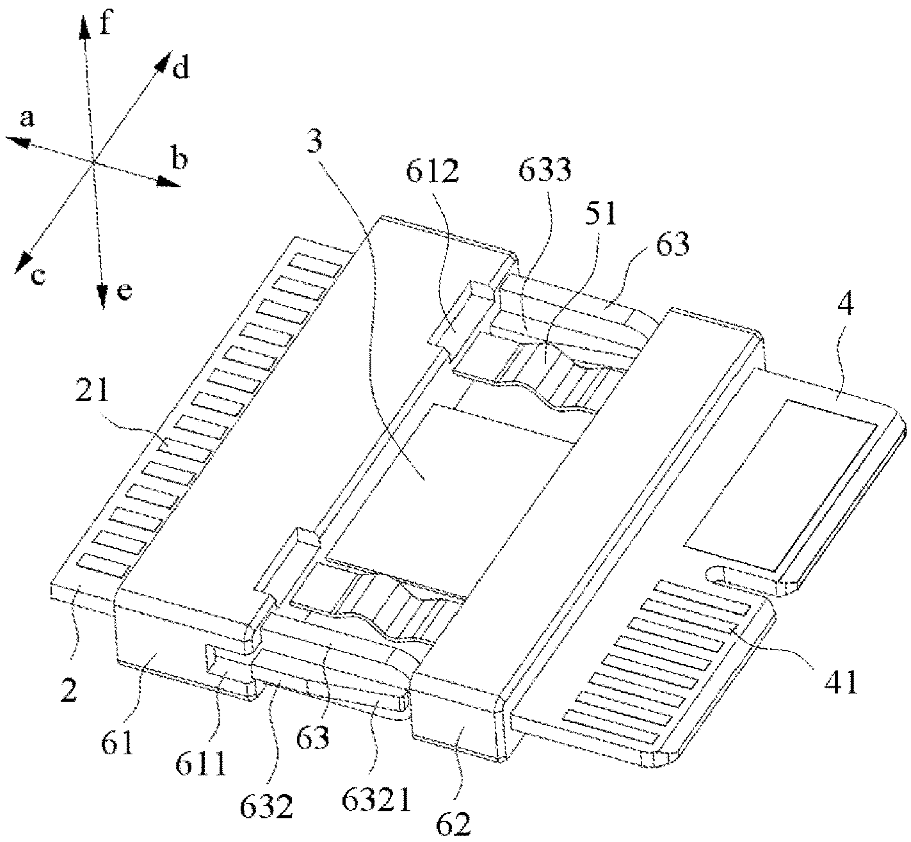
FIG. 2 is a view illustrating part of the structure of a connector according to an embodiment of the present disclosure.
Figure 3:
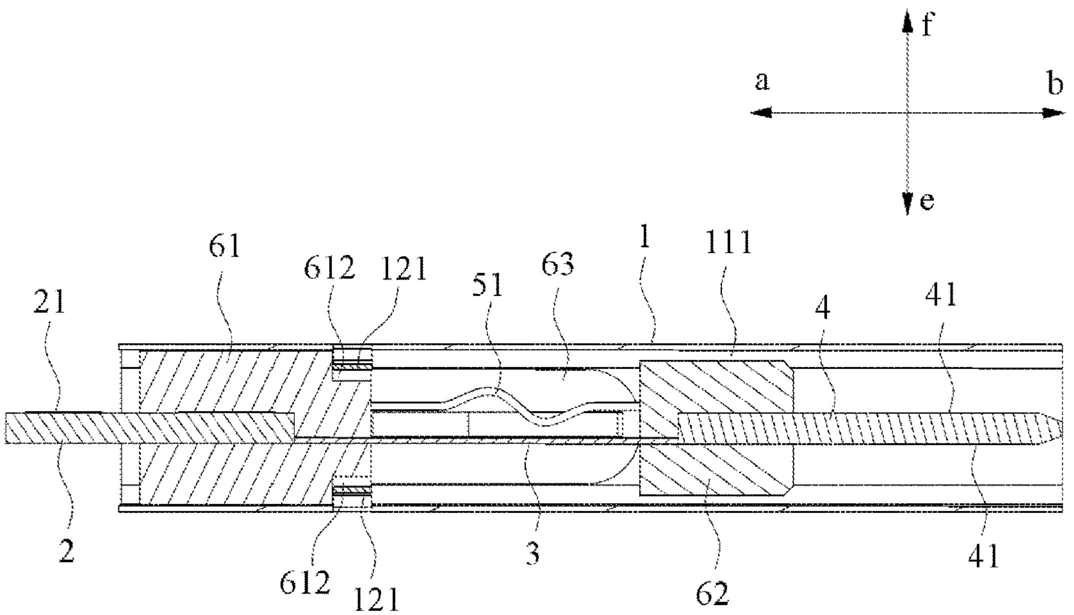
FIG. 3 is a sectional view one illustrating a connector according to an embodiment of the present disclosure.
Figure 4:
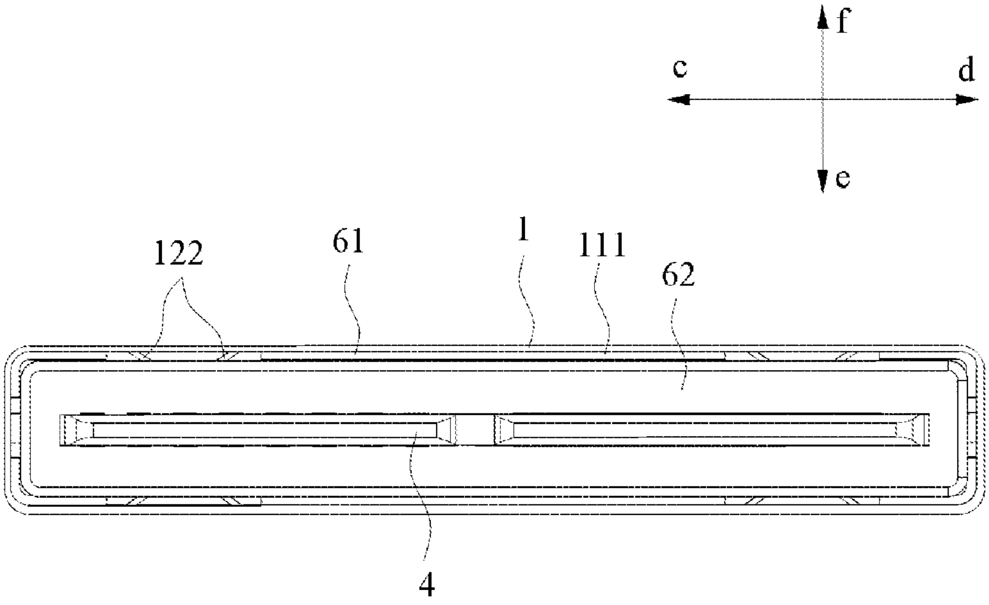
FIG. 4 is a view two illustrating the structure of a connector according to an embodiment of the present disclosure.

As shown in FIGS. 1 to 3, the present disclosure provides a connector including a housing 1, an adapter plate 2, a flexible transmitter 3, a conductive tab 4, and a conductive connection tab 5. The housing 1 is provided with an accommodation cavity 11 in a length direction of the housing 1. The length direction of the housing 1 is the direction indicated by the arrow ab shown in FIG. 1. The adapter plate 2 is configured to transmit an electrical signal. One end of the adapter plate 2 is mounted on the inner wall of the housing 1, and the other end of the adapter plate 2 extends out of one end of the accommodation cavity 11. The flexible transmitter 3 is accommodated in the accommodation cavity 1. One end of the flexible transmitter 3 is connected to the adapter plate 2. The flexible transmitter 3 is a flexible circuit board or a cable. The conductive tab 4 is accommodated in the accommodation cavity 11. One end of the conductive tab 4 is connected to the other end of the flexible transmitter 3, and the other end of the conductive tab 4 is connected to the other end of the accommodation cavity 11. The conductive tab 4 is configured to be connected in alignment to an electrical connection interface on an external product, thereby transmitting the electrical signal. The conductive connection tab 5 is accommodated in the accommodation cavity 11. One end of the conductive connection tab 5 is connected to the adapter plate 2, and the other end of the conductive connection tab 5 is connected to the conductive tab 4. The conductive connection tab 5 is deformable under an external force.

In the connector of the present disclosure, the adapter plate 2 is mounted on the inner wall of the housing 1, the flexible transmitter 3 and the conductive tab 4 are accommodated in the accommodation cavity 11 of the housing 1, and the adapter plate 2 is connected to the conductive tab 4 through the flexible transmitter 3 so that the conductive tab 4 of the connector can swing in a certain range while the connector transmits the electrical signal. Compared with the related connector, the conductive tab 4 of the connector in the present disclosure can be more flexible connected in alignment to the electrical connection interface on the external product, avoiding damaging the product. In addition, the deformable conductive connection tab 5 is connected between the adapter plate 2 and the conductive tab 4, on the one hand, the conductive connection tab 5 can enhance the connection strength between the adapter plate 2 and the conductive tab 4, so that the position of the conductive tab 4 in the case where the conductive tab 4 is not under the external force is ensured, in addition, the stability of swinging in a certain range of the conductive tab 4 is improved in the case where the conductive tab 4 is connected in alignment to the electrical connection interface on the external product, i.e., in the case where the conductive tab 4 is under the external force, and the flexible transmitter 3 is protected; and on the other hand, the conductive connection tab 5 can enhance the overcurrent capability of the connector, achieving the high-current power transmission.

Optionally, the adapter plate 2 and the conductive tab 4 in the present embodiment are hard circuit boards. Referring to FIG. 2, the adapter plate 2 has a gold finger 21 for transmitting the electrical signal. Signal terminals 41 for transmitting the electrical signal are formed on the surface of the conductive tab 4. Multiple signal terminals 41 on the conductive tab 4 are provided and disposed in a width direction of the housing 1. In a height direction of the housing 1, the signal terminals 41 are disposed on both upper and lower surfaces of the conductive tab 4.

Optionally, the housing 1 is a sheet metal part capable of protecting the adapter plate 2, the flexible transmitter 3, the conductive tab 4, and the conductive connection tab 5 that are disposed in the housing 1, shielding irrelevant external signals.

Optionally, referring to FIGS. 2 to 5, a fixing block 61 is disposed on the inner wall of the housing 1. The fixing block 61 is disposed close to one end of the accommodating cavity 11. One end of the adapter plate 2 passes through the fixing block 61. One end of the flexible transmitter 3 extends into the fixing block 61 and is connected to one end of the adapter plate 2. The adapter plate 2 is fixedly connected to the housing 1 by the fixing block 61, ensuring that the flexible transmitter 3 connected to the adapter plate 2 and the conductive tab 4 can be stably accommodated in the accommodation cavity 11 when the flexible transmitter 3 and the conductive tab 4 are not under the external force, thereby enabling the connector to stabilize the transmission current.

Optionally, referring to FIGS. 2 to 5, a stop block 62 is sleeved on one end of the conductive tab 4. The stop block 62 is disposed close to the other end of the accommodation cavity 11. The fixing block 61 and the stop block 62 are disposed at intervals in the length direction of the housing 1. A first gap 111 is formed between the stop block 62 and the inner wall of the housing 1. The other end of the flexible transmitter 3 extends into the stop block 62 and is connected to one end of the conductive tab 4. The stop block 62 can enhance the connection stability between the flexible transmitter 3 and the conductive tab 4, and restrict the swing range of the conductive tab 4, i.e., the first gap 111 between the stop block 62 and the inner wall of the housing 1 is the space in which the conductive tab 4 swings inside the accommodation cavity 11, preventing the conductive tab 4 from overswinging, thereby protecting the conductive tab 4 and the flexible transmitter 3.

Optionally, the fixing block 61 and the stop block 62 are plastic structures, and are inserted and injection molded separately.

Figure 5:
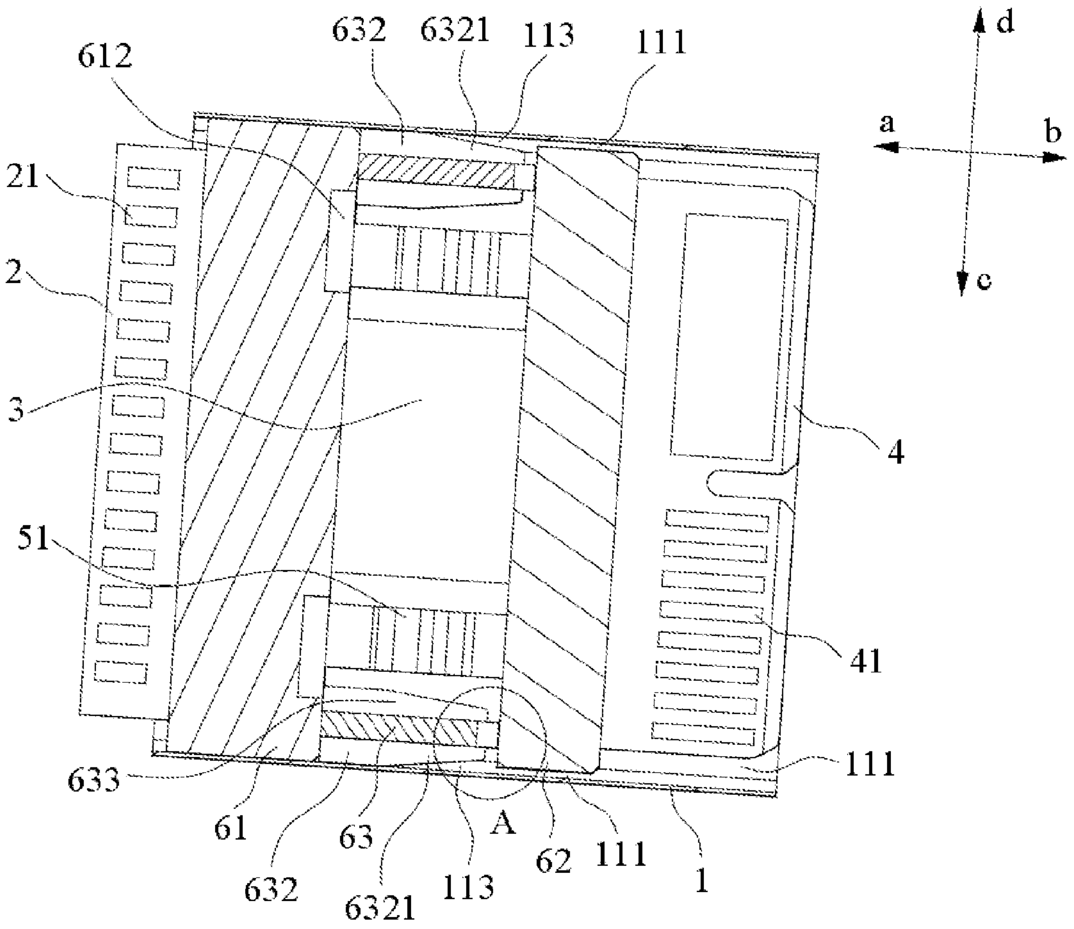
FIG. 5 is a sectional view two illustrating a connector according to an embodiment of the present disclosure.

Optionally, referring to FIGS. 2 and 5, a support block 63 is provided on a surface of the fixing block 61 facing the stop block 62, and a second gap 112 is formed between a surface of the support block 63 facing the stop block 62, and the stop block 62. The support block 63 provided on the fixing block 61 protects the conductive connection tab 5, i.e., when the conductive tab 4 is under an excessive external insertion force, the support block 63 can restrict the distance that the conductive tab 4 moves toward the adapter plate 2, thereby preventing the conductive connection tab 5 from being deformed beyond a critical range under the external force or the conductive connection tab 5 from the misalignment.

Figure 6:
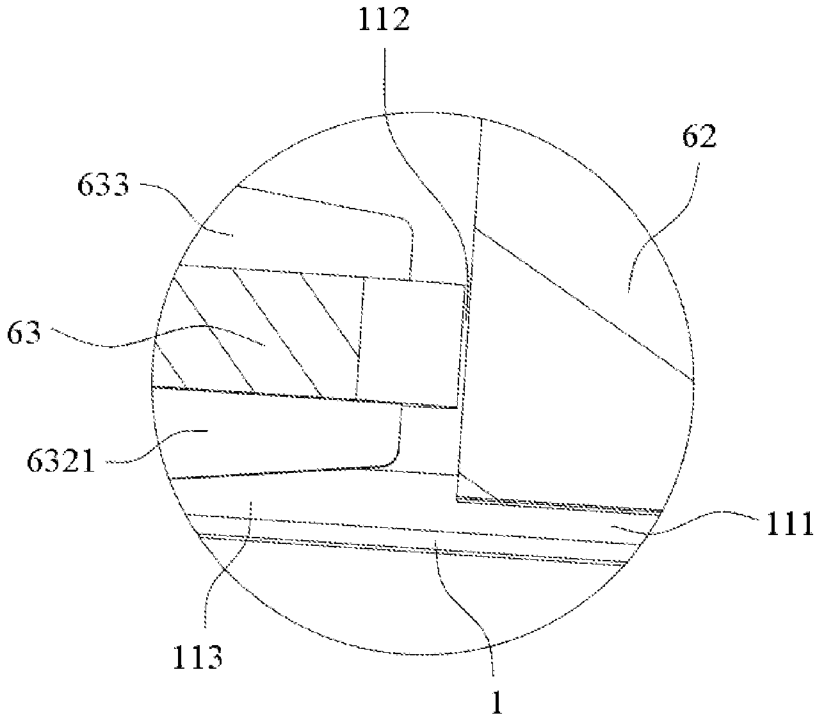
FIG. 6 is a partial enlarged view of part A of FIG. 5.
Figure 7:
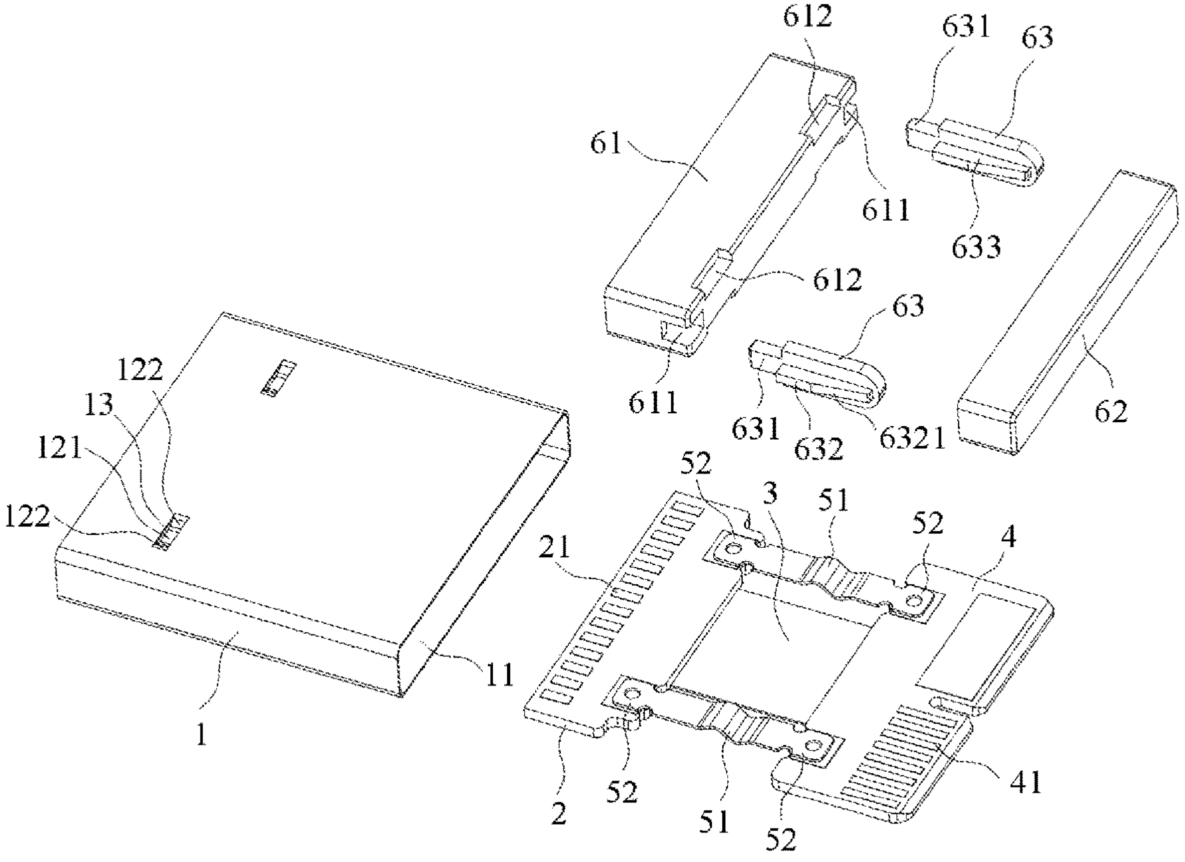
FIG. 7 is a view three illustrating the structure of a connector according to an embodiment of the present disclosure.

Optionally, referring to FIGS. 5 to 7, a fixing head 631 is provided at one end of the support block 63 facing the fixing block 61, a mounting groove 611 is provided on a surface of the fixing block 61 facing the stop block 62, and the fixing head 631 is mounted in the mounting groove 611. The height of the support block 63 is larger than the height of the fixing head 631 in the height direction of the housing 1. The height direction of the housing 1 is the direction indicated by the arrow of shown in FIG. 1. The support block 631 cooperates to the fixing block 611, facilitating connecting the fixing head 631 to the mounting groove 611 firmly when the connector is assembled, and ensuring the product quality.

Optionally, referring to FIG. 7, the surface of the support block 63 facing the stop block 62 is a convex curved surface. The convex curved surface can avoid the support block 63 from scratching the stop block 62 when the conductive tab 4 swings.

Optionally, referring to FIGS. 5 to 7, in a width direction of the housing 1, a detent rib 632 extending in the length direction of the housing 1 is formed on a side surface of the support block 63, the length of the detent rib 632 is smaller than the length of the support block 63, one end of the detent rib 632 abuts against the fixing block 61, and a surface of the detent rib 632 facing away from the support block 63 abuts against the inner wall of the housing 1. When the conductive tab 4 is swung by the external force, the detent rib 632 cooperates with the stop block 62, improving the stability of swinging 4 in the width direction of the housing 1 of the conductive tab 4.

Optionally, referring to FIGS. 5 and 6, the other end of the detent rib 632 extending in the length direction of the housing 1 is provided with an extension section 6321, in the width direction of the housing 1, the width of the extension section 6321 is smaller than the width of the detent rib 632. That is, a third gap 113 is formed between the extension section 6321 and the inner wall of the housing 1, balancing the flexibility and the stability of the swinging of the conductive tab 4 under the external force.

Optionally, referring to FIGS. 5 to 7, in the width direction of the housing 1, a stiffening rib 633 is formed on the other side surface of the support block 63 extending in the length direction of the housing 1. That is, the stiffening rib 633 and the detent rib 632 are arranged on two sides of the support block 63 respectively. One end of the stiffening rib 633 abuts against the fixing block 61. In the width direction of the housing 1, the width of one end of the stiffening rib 633 facing away from the fixing block 61 is smaller than the width of one end of the stiffening rib 633 facing the fixing block 61, ensuring the flexibility and the stability of the swinging of the conductive tab 4 under the external force.

Optionally, the support block 63, the fixing head 631, the detent rib 632, and the stiffening rib 633 may be metallic or made of plastic materials, where the fixing head 631, the detent rib 632, and the stiffening rib 633 are disposed on the support block 63.

Figure 8:
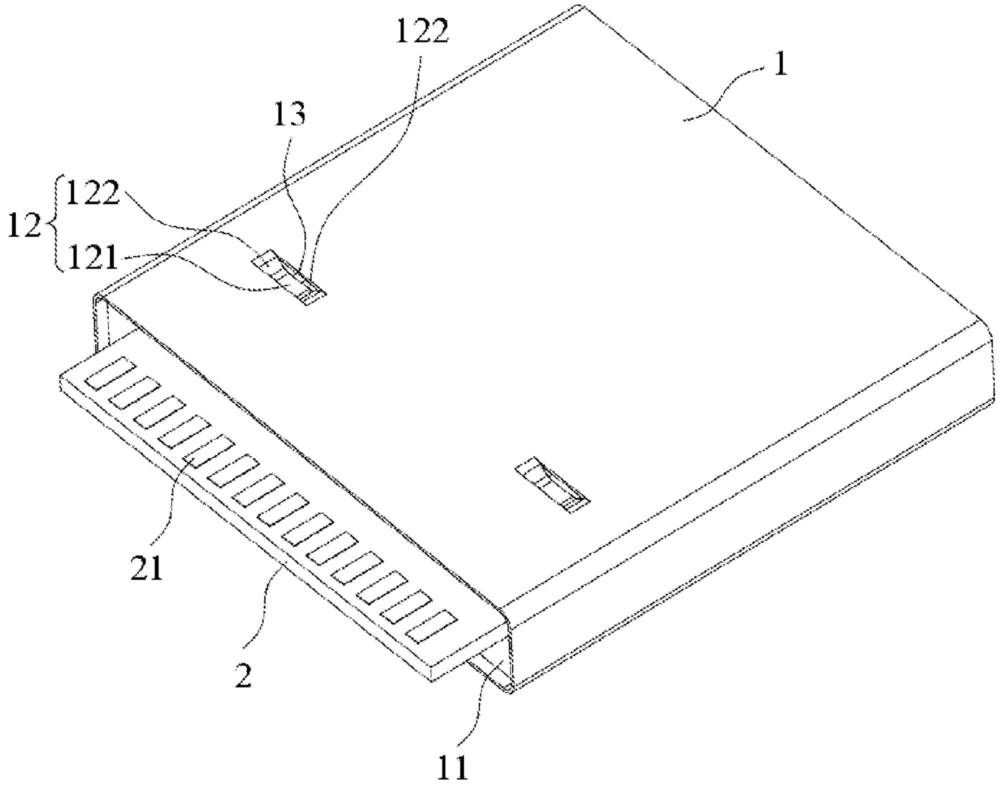
FIG. 8 is an exploded view one illustrating the structure of a connector according to an embodiment of the present disclosure.

Optionally, referring to FIGS. 7 and 8, a stop baffle plate 12 is formed on the housing 1, a positioning groove 612 is formed on the fixing block 61, and the stop baffle plate 12 is accommodated in the positioning groove 612. The stop baffle plate 12 cooperates with the positioning groove 612, so that the fixing block 61 can be accurately positioned and assembled to the housing 1.

Optionally, referring to FIGS. 7 and 8, a via 13 communicating with the accommodation cavity 11 is provided on an outer surface of the housing 1, the via 13 faces the positioning groove 612 on the fixing block 61, the stop baffle plate 12 is a bending structure, and two ends of the stop baffle plate 12 are connected to a via wall of the via 13 separately. The structure arrangement of the via 13 and the stop baffle plate 12 can not only facilitate processing and forming the stop baffle plate 12 on the housing 1, but also conduct heat in the accommodation cavity 11 to the outside of the housing 1 by the via 13.

Optionally, referring to FIGS. 7 and 8, the stop baffle plate 12 includes a first baffle tab 121 and two second baffle tabs 122 connected to two ends of the first baffle tab 121 respectively. Each of the two second baffle tabs 122 is disposed at an angle with respect to the first baffle tab 121. One end of each of the two second baffle tabs 122 facing away from the first baffle tab 121 is connected to the via wall of the via 13, and the first baffle tab 121 is accommodated in the positioning groove 612.

Figure 9:
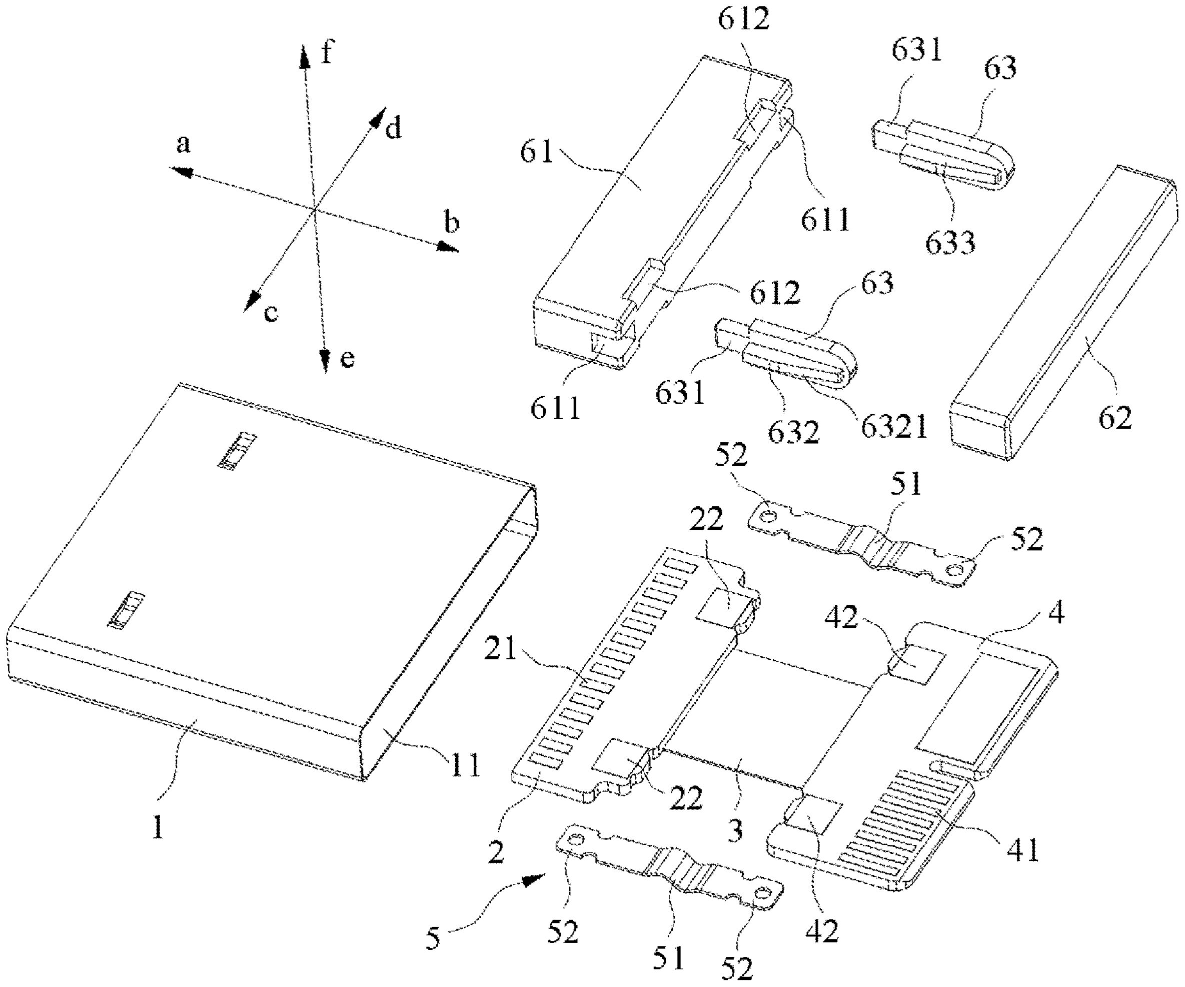
FIG. 9 is an exploded view two illustrating the structure of a connector according to an embodiment of the present disclosure.

Optionally, referring to FIGS. 7 and 9, the conductive connection tab 5 includes a bending section 51, and two connection sections 52 connected to two ends of the bending section 51 respectively. The bending section 51 is located between the fixing block 61 and the stop block 62. A first weld portion 22 is formed on the adapter plate 2. One of the two connection sections 52 is weld to the first weld portion 22 of the adapter plate 2. A second weld portion 42 is formed on the conductive tab 4. The other of the two connection sections 52 is weld to the second weld portion 42 of the conductive tab 4. The bending section 51 in the present embodiment is wavy. The shape of the bending section 51 on the conductive connection tab 5 facilitates improving the stability of the deformation of the conductive connection tab 5.

Optionally, the conductive connection tab 5 in the present embodiment may be fixedly connected to the adapter plate 2 or the conductive tab 4 in the manner of patching or via welding.

Optionally, multiple conductive connection tabs 5 are provided. In the width direction of the housing 1, the multiple conductive connection tabs 5 are located on two sides of the flexible transmitter 3. The width direction of the housing 1 is the direction indicated by the arrow cd shown in FIG. 1. The multiple conductive connection tabs 5 can further enhance the overcurrent capability of the connector, and enhance the connection stability between the adapter plate 2 and the conductive tab 4.

Optionally, in other embodiments, two conductive connection tabs 5 and two support blocks 63 are provided. Two support blocks 63 are located on two sides of the flexible transmitter 3 respectively. The two conductive connection tabs 5 are located on two sides of the flexible transmitter 3 respectively, and each of the two conductive connection tabs 5 is located between the flexible transmitter 3 and a corresponding one of the support blocks 63.

Optionally, the conductive connection tab 5 is made of a metallic material, such as copper, stainless steel or the like.

In the connector of the present disclosure, the adapter plate is mounted on the inner wall of the housing, the flexible transmitter and the conductive tab are accommodated in the accommodation cavity of the housing, and the adapter coupling between the adapter plate and the conductive tab is performed by means of the flexible transmitter so that the conductive tab of the connector can swing in a certain range while the connector transmits the electrical signal. Compared with the related connector, the connector in the present disclosure can be more flexible connected in alignment to the electrical connection interface on the external product, avoiding damaging the product. In addition, the deformable conductive connection tab is connected between the adapter plate and the conductive tab, on the one hand, the conductive connection tab can enhance the connection strength between the adapter plate and the conductive tab, so that the position of the conductive tab in the case where the conductive tab is not under the external force is ensured, in addition, the stability of swinging in a certain range of the conductive tab is improved in the case where the conductive tab is connected in alignment to the electrical connection interface on the external product, i.e., in the case where the conductive tab is under the external force, and the flexible transmitter is protected; and on the other hand, the conductive connection tab can enhance the overcurrent capability of the connector, achieving the high-current power transmission.

What is claimed is:

1. A connector, comprising:

a housing provided with an accommodation cavity extending through the housing in a length direction of the housing;

an adapter plate for transmitting an electrical signal, wherein one end of the adapter plate is mounted on an inner wall of the housing, and the other end of the adapter plate extends out of one end of the accommodation cavity;

a flexible transmitter accommodated in the accommodation cavity, wherein one end of the flexible transmitter is connected to the adapter plate;

a conductive tab accommodated in the accommodation cavity, wherein one end of the conductive tab is connected to the other end of the flexible transmitter, and the other end of the conductive tab faces the other end of the accommodation cavity; and a conductive connection tab accommodated in the accommodation cavity, wherein one end of the conductive connection tab is connected to the adapter plate, the other end of the conductive connection tab is connected to the conductive tab, and the conductive connection tab is deformable.

2. The connector of claim 1, wherein a fixing block is formed on the inner wall of the housing, the one end of the adapter plate passes through the fixing block, and the one end of the flexible transmitter extends into the fixing block and is connected to the adapter plate.

3. The connector of claim 2, wherein a stop block is sleeved on the one end of the conductive tab, the fixing block and the stop block are disposed at intervals in the length direction of the housing, a first gap is formed between the stop block and the inner wall of the housing, and the other end of the flexible transmitter extends into the stop block and is connected to the conductive tab.

4. The connector of claim 3, wherein a support block is provided on a surface of the fixing block facing the stop block, and a second gap is formed between a surface of the support block facing the stop block, and the stop block.

5. The connector of claim 4, wherein a fixing head is formed at one end of the support block facing the fixing block, a mounting groove is provided on the fixing block, and the fixing head is mounted in the mounting groove.

6. The connector of claim 4, wherein a detent rib extending in the length direction of the housing is formed on a side surface of the support block, one end of the detent rib abuts against the fixing block, and a surface of the detent rib facing away from the support block abuts against the inner wall of the housing.

7. The connector of claim 2, wherein a stop baffle plate is formed on the housing, a positioning groove is formed on the fixing block, and the stop baffle plate is accommodated in the positioning groove.

8. The connector of claim 7, wherein a via communicating with the accommodation cavity is formed on an outer surface of the housing, the stop baffle plate is a bending structure, and two ends of the stop baffle plate are connected to a via wall of the via separately.

9. The connector of claim 1, wherein the flexible transmitter is a flexible circuit board or a cable.

10. The connector of claim 1, wherein the conductive connection tab comprises a bending section, and two connection sections connected to two ends of the bending section respectively, one of the two connection sections is connected to the adapter plate, and the other of the two connection sections is connected to the conductive tab.

* * * * *